F. TUREK.
GAGE.
APPLICATION FILED FEB. 2, 1910.
977,055. Patented Nov. 29, 1910.
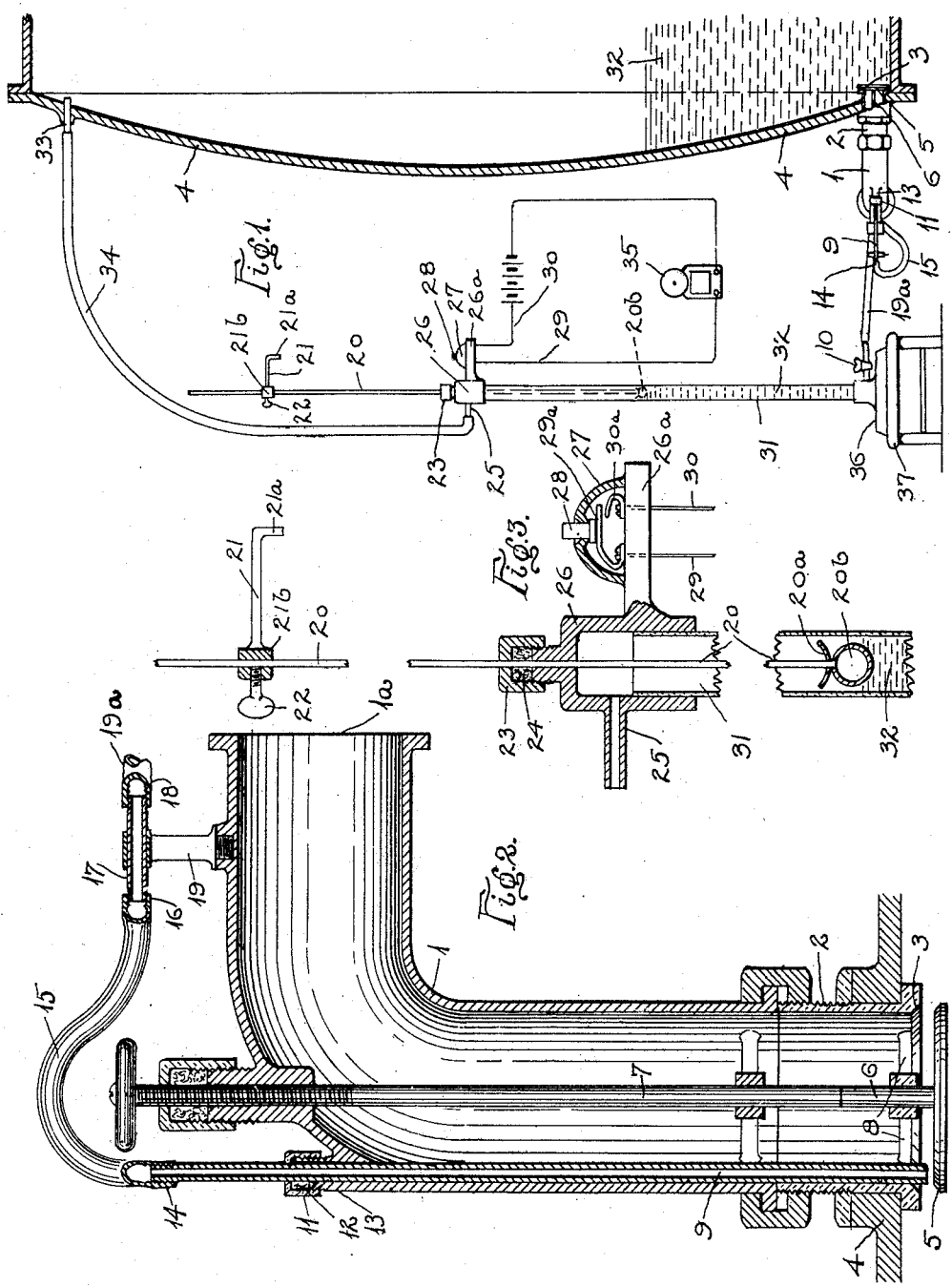
Witnesses:
Monroe E. Miller
Stedman J. Rockwell
Ferdinand Turek, Inventor,
By Bommhardt & Co.
Attorneys.

UNITED STATES PATENT OFFICE.

FERDINAND TUREK, OF CLEVELAND, OHIO.

GAGE.

977,055. Specification of Letters Patent. Patented Nov. 29, 1910.

Application filed February 2, 1910. Serial No. 541,552.

*To all whom it may concern:*

Be it known that I, FERDINAND TUREK, a citizen of the United States, residing at Cleveland, in the county of Cuyahoga and State of Ohio, have invented certain new and useful Improvements in Gages, of which the following is a specification.

This invention is an indicator or gage particularly adapted for use in beer apparatus, but capable of other uses to which it is appropriate.

With respect to its use in a racking and filtering system for beer, it may be explained that a chip cask is used, in which the yeast and other impurities are allowed to settle, and the beer is drawn from the chip cask by a pump and carried to a filter. It is desirable that a certain amount of beer be left in the cask, because when the beer begins to run low, a part of the yeast may be drawn by the pump. It is therefore the practice to leave several inches of beer in the bottom of the cask, which can be drawn off and allowed to settle in another cask called a rest cask.

In order to determine the amount of beer in the cask, and to avoid drawing a quantity of yeast into the filter a gage or indicator is used, the gage glass being connected to the pipe or outlet through which the beer is drawn. The objection to this is that when the pump is working the effect of the suction and variation of pressure on the gage glass has been to cause an erroneous indication, the level of the beer in the gage glass fluctuating, and often being several inches lower than that in the tank, in consequence of which it has been impossible to determine the level of the beer. A further objection to existing arrangements also is that when the quantity of beer is small the pump draws air into the pipe, from the glass gage.

The present invention avoids these defects by providing a gage which is connected to the outlet pipe, but which nevertheless is not affected by the pump.

A further object of the invention is to provide means for sounding a signal when the beer reaches a predetermined low level.

The invention is illustrated in the accompanying drawings in which—

Figure 1 is a side elevation of the gage, the chip cask being shown in section. Fig. 2 is an enlarged detail in horizontal section of the valve and outlet pipe connection at the bottom of the cask, showing also a tube which supplies the gage. Fig. 3 is a detail in vertical section of the gage, parts being broken away.

Referring specifically to the drawings, 4 indicates the chip cask or other tank to which the device is applied. This has an outlet nipple 2 provided with an internal valve seat 3. A pipe 1 is connected to the nipple 2, and the suction pipe of the pump (not shown), will be connected at $1^a$. The outlet valve disk 5 coöperates with the seat 3, and its stem 6 works in a spider 8. The valve rod 7 may be screwed in to force the valve from its seat and open the same. When the rod 7 is withdrawn from the stem 6 the valve acts as a check valve, which closes by the pressure in the tank.

A tube 9 extends through a gland 11 on a nipple 13 at the elbow of the pipe 1, said gland being provided with packing 12. The tube 9 may be pushed in or pulled out to a necessary extent, and when pushed in it extends beyond the end of the outlet pipe and into the cask, so that it receives liquid from the cask rather than from the outlet pipe. The tube 9 is connected at 14 by a flexible tube 15 which connects to a tube 17 supported by a bracket 19, and this piece 17 is connected as at 18, by a piece of tubing $19^a$ to the inlet at the lower end of the gage glass 31. Said inlet may have a valve 10 if desired. The purpose of these connections is to permit manipulation of the tube $19^a$ without disturbing the movable tube 9, which must set in quite exact position.

The gage glass 31 stands upright on a base 36 which may be set on a stool 37 to bring the bottom of the glass at approximately the same height as the bottom of the chip cask. At its upper end the gage 31 has a cap 26 through which slides a rod 20, a gland 23, the packing of which is indicated at 24, being provided therefor. At its lower end, within the glass, the rod 20 has a float $20^b$, with an upper cup $20^a$ if desired. On the upper exposed end of the rod 20 is an arm 21 fastened to the rod by the collar $21^b$ and set screw 22 for adjustment, and at the outer end of the arm 21 is a depending finger $21^a$. The gage glass is graduated as at 32. The cap of the glass has a nipple 25 to which is connected a tube 34 which opens into the top of the cask at the nipple 33, to equalize the pressure in the gage glass and the cask.

On an arm 26ª projecting from the cap 26 is a push button 28, working in a casing 27 and acting to close the contacts 29ª and 30ª of the conductors 29 and 30 in circuit with a bell 35.

In use and operation, after the elbow 1 has been fastened to the nipple 2, and the rod 7 screwed in to open the valve, the tube 9 is pushed in to extend into the tank, and receives the beer at the tank pressure, and the beer accordingly rises to a corresponding extent in the gage glass. When so arranged, the suction of the pump through the pipe 1 does not materially affect the liquor in the gage glass as it does when the gage connection is made directly to the suction pipe, and hence the gage indicates an approximately correct level, and the rod 20 rises and falls according to the amount of beer in the cask. When the liquor is drawn off to a sufficient extent the finger 21ª strikes the push button 28 and closes the bell circuit which sounds an alarm and gives notice that the beer in the cask has reached the predetermined low level, and consequently the pump will not draw chips, yeast, etc., from the bottom of the cask. When the rod 7 is withdrawn the valve 5 closes and pushes out the tube 9. By disconnecting the tubes 19ª and 34 the gage can then be applied to another cask. One gage is therefore sufficient for a considerable number of casks. The turbid beer remaining in the cask can afterward be drawn off into the rest tank, as usual.

What I claim as new is:—

1. The combination of a tank, an outlet pipe connection to the tank, and a gage provided with connections to the tank, the gage connections including a tube extending and movable through said pipe and into the tank.

2. The combination of a tank, an outlet pipe from the tank, a valve at the inner end of the pipe, and a gage connection including a tube extending through the wall of the pipe and movable to advance the inner end of the tube beyond the valve seat and into the tank.

3. The combination of a tank, an outlet pipe from the tank, said pipe being provided with a valve, and a gage connection including a tube in the pipe with its inner end located in the valve seat opening, and on the opposite side of the valve to the tank, the tube being slidable to advance its inner end through said opening, when the valve is forced from its seat.

4. The combination of a tank, a valved outlet nozzle fastened thereto, an outlet pipe detachably connected to said nozzle, and a gage connection including a tube mounted on said pipe and removable therewith, said tube being movable with respect to the pipe to advance its inner end through the nozzle and into the tank, when the pipe is attached.

In testimony whereof, I do affix my signature in the presence of two witnesses.

FERDINAND TUREK.

Witnesses:
STEDMAN J. ROCKWELL,
MONROE E. MILLER,